(No Model.) 2 Sheets—Sheet 1.

C. B. RICE.
COMBINED PROVISION BOX AND TABLE.

No. 380,218. Patented Mar. 27, 1888.

Witnesses:
E. A. Brandan
T. Duffy

Inventor:
Calvin Bacon Rice
By his Att'y
Alphonso Smith (No Model.) 2 Sheets—Sheet 2.
C. B. RICE
COMBINED PROVISION BOX AND TABLE.
No. 380,218. Patented Mar. 27, 1888.
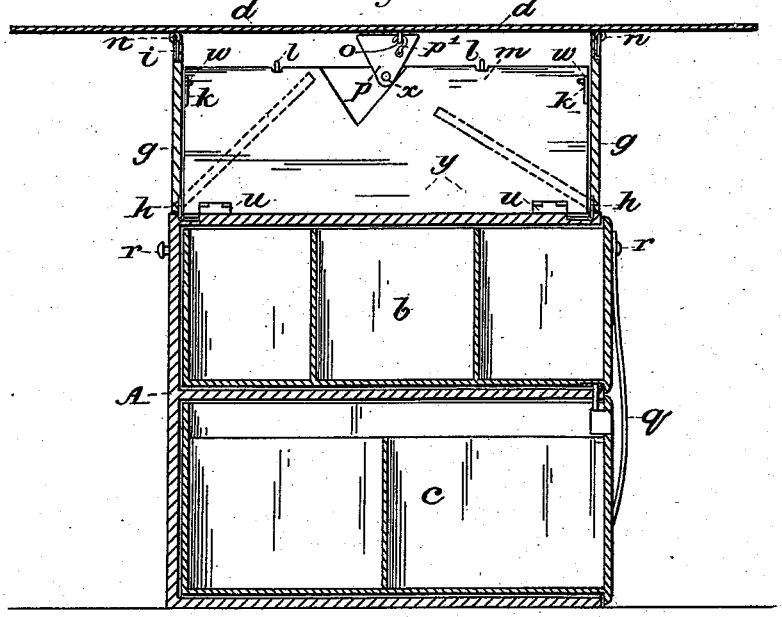
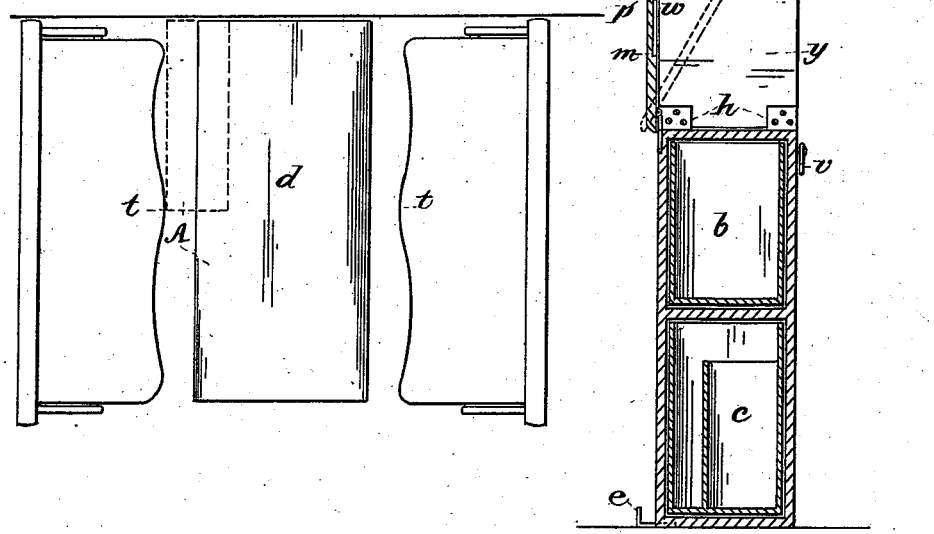
Witnesses:
E. A. Brandau
J. Duffy
Inventor:
Calvin Bacon Rice
By his Atty.
Alphonso Smith

UNITED STATES PATENT OFFICE.

CALVIN BACON RICE, OF EAST OAKLAND, CALIFORNIA.

COMBINED PROVISION-BOX AND TABLE.

SPECIFICATION forming part of Letters Patent No. 380,218, dated March 27, 1888.

Application filed June 4, 1886. Renewed December 27, 1887. Serial No. 259,070. (No model.)

*To all whom it may concern:*

Be it known that I, CALVIN BACON RICE, a resident of East Oakland, county of Alameda, State of California, have invented a new and useful Travelers' Provision-Box, Table, and Seat Combined; and I hereby declare that the following is a full, clear, and exact description of the same, reference being had to the accompanying drawings.

My invention relates to a device for the use and convenience of travelers on railways, which combines in a compact form a provision-box, table, and seat.

The following description fully explains the nature of my said invention and the manner in which I proceed to construct, apply, and use the same, the accompanying drawings being referred to by figures and letters.

Figure 1:
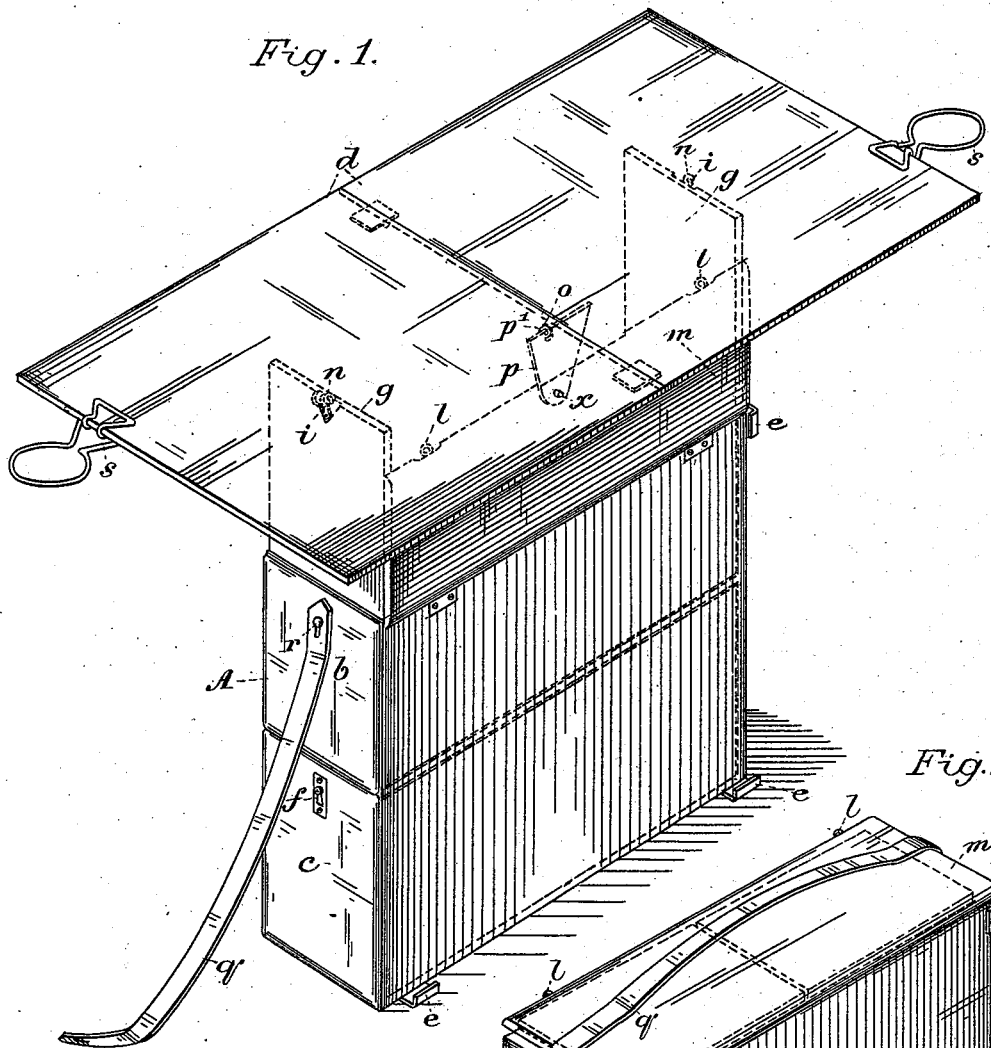
Figure 2:
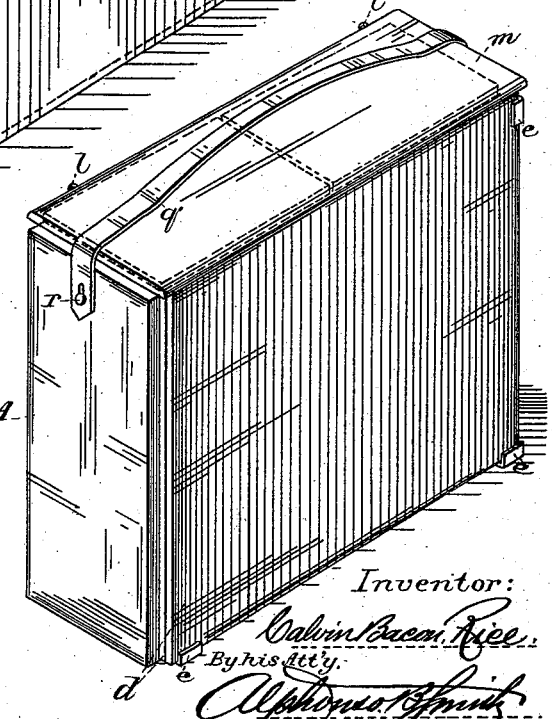
Figure 3:
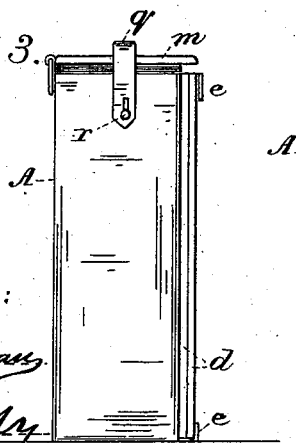

Figure 1 is a perspective view of the device, showing it arranged as a table. Fig. 2 is a perspective view of the same, showing it in portable form. Fig. 3 is an end elevation of the same. Fig. 4 is a longitudinal vertical section showing the manner of attaching and securing the leaves of the table. Fig. 5 is a transverse vertical section showing the same. Fig. 6 is a plan view showing the device arranged as a table between the seats of a railway-car, and dotted lines showing the device in a portable form.

My device consists of a box, A, Fig. 1, made of suitable wood, of dimensions equal to the height of a railway-seat and about half the length of the same, and thick enough to form conveniently part of the seat. In the end of the box there are two drawers, *b c*, separated by a horizontal partition, the lower drawer, *c*, being provided with a lock, *f*, by which both drawers are locked. These drawers may be made of wood or metal and provided with suitable compartments for food and table-utensils. Attached on three corners of the rear side of the box are flanged supports *e* for holding table-leaves *d*. These leaves are joined at the center by hinges, by which they are folded to the size of the box, and when they are unfolded and attached for use they form a table double the length of the box. Near the center of the under side of each leaf there is an eye-screw, *n*, and near the central point, where the leaves are hinged, there is a similar eye-screw, *o*, to which hooks are attached. Near the edge of the front side of the box there are hooks *v* for securing the lid or cover *m* to eye-screws *l*. In each end of the box near the top there is a button, *r*, to which the suspending-strap *q* is attached.

For the purpose of attaching and properly securing the table-leaves and to give them a convenient height I attach by hinges *h* to the top of the box on each end folding supports *g*, which are raised in a vertical position and secured by hooks *k* on the inner side of the supports to eye-screws *w* on the lid or cover *m*, and by hooks *i* on the outer side of the supports to eye-screws *n* on the table-leaves. I do not, however, confine myself to this manner of securing the table-leaves to the vertical supports *g*, as I may do the same thing by other suitable devices.

The cover or lid *m* of the box is attached thereto by hinges *u*. In order to support the table-leaves in the center, an adjustable metal support, *p*, having a hook, *p'*, is attached to the cover by a pivot-pin, *x*, and when this support is raised its hook *p'* is secured to the eye-screw *o* on one of the table-leaves, Figs. 1, 4.

To properly secure the drinking-vessels and at the same time to add to the table-space, I provide holders *s*, made of strong wire, which are slipped over the edge of the table-leaf and clasp it firmly, Fig. 1. These holders are very convenient for holding tumblers.

The recess *y*, Fig. 5, which is formed at the top by the leaves of the table, at the sides by the vertical supports *g*, and at the back by the lid *m*, is an important feature of my device, as it offers a convenient receptacle for articles of food or drink, or for table-utensils designed for use in the course of a meal.

After my provision-box has been employed as a table it may be readily readjusted by disengaging the leaves, folding them and placing them in their flanged supports *e*, folding the vertical supports *g* on top of the box, closing the lid *m* and securing it by the hooks *v* to the eye-screws *l*, and then attaching the suspending-strap *q* to the buttons *r*, as shown in Fig. 2. The portable box may then be placed in front of the railway-seat, and as the box is narrow it may form part of the seat without inconvenience to the occupant. The weight and size of the box render it as portable as a common valise, and it may be used as a seat in the car or in the ante-room or on the platform.

Having thus fully described my invention, what I claim, and desire to secure by Letters Patent, is—

1. In a provision-box, table, and seat combined, the box A, having locked drawers $b\ c$, each drawer having compartments for food and table-utensils, folding vertical supports $g$ for the table-leaves $d$, provided with hooks $i\ k$ for attaching to eye-screws $n\ w$, a lid, $m$, attached by hinges $u$ and having an adjustable support, $p$, pivoted on pin $x$, and a hook, $p'$, for attaching to eye-screw $o$, and eye screws $l$ for attaching hooks $v$, the said table-leaves $d$, supports $g$, and lid $m$ forming a recess, $y$, as a receptacle for food and utensils, flanged supports $e$ for holding the folded table-leaves, and suspending-strap $q$, attached on buttons $r$, as described, and for the purpose set forth.

2. The combination of the leaves $d$, joined by hinges and folding together and adjustable on the box as a table, provided with adjustable holders $s$ for drinking-vessels, and having eye-screws $n$ for attaching hooks $i$, and eye-screw $o$ for attaching hook $p'$ of adjustable support $p$, and the box A, having drawers $b\ c$, vertical supports $g$, lid $m$, flanged supports $e$, and suspending-strap $q$, substantially as and for the purpose described.

CALVIN BACON RICE. [L. S.]

Witnesses:
ALPHONSO B. SMITH,
FERDINAND IMHORST.